United States Patent
Luo et al.

(10) Patent No.: US 9,983,359 B2
(45) Date of Patent: May 29, 2018

(54) POLARIZATION-INSENSITIVE OPTICAL TRANSCEIVER

(71) Applicant: Oracle International Corporation, Redwood Shores, CA (US)

(72) Inventors: Ying Luo, San Diego, CA (US); Xuezhe Zheng, San Diego, CA (US); Jin Yao, San Diego, CA (US); Ashok V. Krishnamoorthy, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days. days.

(21) Appl. No.: 15/685,716

(22) Filed: Aug. 24, 2017

(65) Prior Publication Data

US 2018/0095224 A1    Apr. 5, 2018

Related U.S. Application Data

(62) Division of application No. 15/184,856, filed on Jun. 16, 2016, now Pat. No. 9,766,404.

(51) Int. Cl.
| | |
|---|---|
| *G02B 6/293* | (2006.01) |
| *G02B 6/122* | (2006.01) |
| *G02B 6/12* | (2006.01) |

(52) U.S. Cl.
CPC ......... *G02B 6/29397* (2013.01); *G02B 6/122* (2013.01); *G02B 6/1228* (2013.01); (Continued)

(58) Field of Classification Search
CPC  G02B 6/29397; G02B 6/122; G02B 6/29361; G02B 6/2938; G02B 6/1228; G02B 2006/12097
See application file for complete search history.

(56) References Cited

U.S. PATENT DOCUMENTS

| | | |
|---|---|---|
| 7,103,245 B2 | 9/2006 | Lee |
| 8,295,656 B2 | 10/2012 | Schell |
| 9,341,786 B1 | 6/2016 | Gamache |

OTHER PUBLICATIONS

Djordjevic et al.; "CMOScompatible, athermal silicon ring modulators clad with titanium dioxide", Optics Express vol. 21, No. 12, 13958-13968 (2013).

(Continued)

*Primary Examiner* — Ryan Lepisto
(74) *Attorney, Agent, or Firm* — Park, Vaughan, Fleming & Dowler LLP (57) ABSTRACT

An integrated circuit that includes a wavelength-filter layer stack (which may include silicon oxynitride) and an optical substrate (such as a silicon-on-insulator platform) is described. During operation, an optical signal received from an optical fiber or an optical waveguide is wavelength filtered into a set of wavelength-filter optical waveguides by an optical multiplexer/demultiplexer (such as an Echelle grating and/or an array waveguide grating) in the wavelength-filter layer stack. Then, wavelength-filtered optical signals are optically coupled to the optical substrate, where they are received using photodetectors. Alternatively, modulators in the optical substrate modulate wavelength-filtered modulated optical signals, which are then optically coupled to the set of wavelength-filter optical waveguides in the wavelength-filter layer stack. Next, the wavelength-filtered modulated optical signals are combined using the optical multiplexer/demultiplexer, and the resulting optical signal is output to the optical fiber or the optical waveguide.

7 Claims, 6 Drawing Sheets

(52) U.S. Cl.
CPC ....... *G02B 6/2938* (2013.01); *G02B 6/29361* (2013.01); *G02B 2006/12097* (2013.01)

(56) References Cited

OTHER PUBLICATIONS

Guha et al.; "CMOS-compatible athermal silicon microring resonators", Optics Express vol. 18, No. 4, 3487-3493, (2010).
Streshinsky et al.; "A compact bi-wavelength polarization splitting grating coupler fabricated in a 220 nm SOI platform," Optics Express, vol. 21, No. 25, 31019-31028, (2013).
Guan et al.; "CMOS-compatible highly efficient polarization splitter and rotator based on a double-etched directional coupler," Optics Express, vol. 22, No. 3, 2489-2496, (2014).
Wang et al.; "Novel ultra-broadband polarization splitter-rotator based on mode-evolution tapers and a mode-sorting asymmetric Y-junction," Optics Express, vol. 22, No. 11, 13565-13571, (2014).
Chen et al.; "Polarization-independent grating couplers for silicon-on-insulator nanophotonic waveguides", Optics Lett. vol. 36, No. 6, 796-798 (2011).
Xia et al.; "Experimental demonstration of birefringence compensation using angled star couplers in silica-based arrayed waveguide grating", IEEE Photonics Journal, vol. 4, No. 6, 2235-2242 (2012).
Feng et al.; "Fabrication insensitive Echelle grating in silicon-on-insulator platform", IEEE Photonics Tech. Lett. vol. 23, No. 5, 284-286 (2011).

POLARIZATION-INSENSITIVE OPTICAL TRANSCEIVER

RELATED APPLICATION

This patent application is a division of, and hereby claims priority under 35 U.S.C § 120 to, pending U.S. patent application Ser. No. 15/184,856, entitled "Polarization-Insensitive Optical Transceiver," by inventor Ying Luo, Xuezhe Zheng, Jin Yao and Ashok V. Krishnamoorthy, filed on 16 Jun. 2016, the contents of which are herein incorporated by reference in their entirety for all purposes.

GOVERNMENT LICENSE RIGHTS

This invention was made with U.S. Government support under Agreement No. HR0011-08-9-0001 awarded by DARPA. The U.S. Government has certain rights in the invention.

BACKGROUND

Field

The present disclosure relates to techniques for transmitting and receiving optical signals. More specifically, the present disclosure relates to a polarization-insensitive optical transceiver.

Related Art

In order to provide a large bandwidth density, many optical communication systems use wavelength-division multiplexing (WDM). Moreover, in order to perform WDM it is often important to effectively perform wavelength filtering. Typically, WDM filters need to have: low loss, low crosstalk, flat passband, and accurate wavelength channel alignment with little or no tuning.

Silicon photonics is gaining increasing acceptance as the platform for photonic integration of optical communications. For example, submicron silicon-on-insulator (SOI) technology (with silicon-layer thicknesses typically ranging from 200 to 500 nm) can provide a very compact platform that enables optical propagation using highly confined optical modes and allows scaling integrated photonic devices down to the submicron level. However, WDM filters on silicon, such as ring-resonator based wavelength filters, are usually very sensitive to ambient temperature fluctuations because of the high thermo-optic (TO) coefficient of silicon (approximately $1.86 \cdot 10^{-4}/K$). Because the temperature variation in a typical application environment can be 10s of degrees, active tuning is usually needed for silicon-based WDM filters.

However, active-temperature compensation techniques usually have high power consumption and can be difficult to implement, because they often use silicon/metal heaters, thermoelectric coolers (TECs) and closed-loop feedback controllers to maintain the local temperature. The two promising techniques for achieving passive athermalization of silicon are the use of materials with negative TO coefficients in optical waveguide claddings, and embedding a micro-ring in a thermally balanced interferometer.

The concept of using a negative TO coefficient in optical waveguide cladding is to balance the positive TO coefficients of the silicon core and silicon-dioxide substrate by engineering the optical mode confinement and the negative TO coefficient of the optical waveguide cladding. In practice, it can be difficult to implement this concept. For example, with polymer-based cladding materials, in addition to needing precise control of the material composition, it can be challenging to fabricate these materials in a manner that is compatible with CMOS processes. In particular, polymer materials often suffer from moisture absorption, chemical instability, UV aging, and poor mechanical characteristics.

Alternatively, titanium dioxide has a negative TO coefficient and is CMOS-compatible. However, in order to achieve a zero net thermal-optic coefficient of the optical waveguides, it is often necessary to re-engineer the optical mode such that it is less confined in the optical waveguide and is more distributed in the over-cladding region (e.g., by thinning or narrowing the optical waveguide, or by using a slotted structure). These techniques for reducing the optical mode confinement in the core typically result in an increase in propagation loss and bending loss, which further negatively impacts the resonator Q factor and footprint.

Instead of using a material with a negative TO coefficient, in another approach a ring resonator is optically coupled to a Mach-Zehnder interferometer (MZI). In this approach, the thermal drift of the ring resonator may be passively compensated for by tailoring the optical mode confinement in the optical waveguides in the MZI. While the use of the MZI can eliminate the need for new layers or materials, it can be difficult to fabricate the MZI because of strict constraints on the dimensions of the optical waveguides.

In addition to temperature dependence, another challenge for a submicron SOI platform is achieving polarization-transparent operation at the receiver. In particular, because of its high index-of-refraction contrast, submicron SOI circuits with a slab normally support the propagation of only one polarization mode (e.g., the TE-polarized mode). While, in principle, the TM-polarized mode is supported for very narrow optical waveguides (in a symmetric environment), in practice the effective index of refraction of such optical waveguides are very close to the index of refraction of the buried-oxide layer, so guiding is usually very weak (and, thus, there is usually high propagation loss). Furthermore, the polarization of the input light from an optical fiber is usually not fixed. Instead, the polarization state often changes because of deviations, such as elliptical cores, twists or bends, anisotropic stresses, temperature and pressure changes. Consequently, polarization-insensitive photonic devices and circuits are typically needed (particularly at the receiver) in order to capture the incoming light and to avoid performance degradation.

A variety of approaches have been considered for addressing the polarization-dependence of photonic devices and circuits, including: polarization-maintaining (PM) optical fibers, a polarization-state controller, and polarization-diversity systems (such as polarization splitters, rotators, and/or switches). A PM optical fiber usually requires intricate alignment at every splice and connector, and it is often costly and impractical to replace existing optical fibers. Moreover, a polarization-diversity technique typically involves dividing the input optical signal into two orthogonal components. These two orthogonal components are then routed separately to WDM filters, and recombined either optically or electrically to form the final output signal. However, the optical paths and circuits associated with the two polarizations generally need to be identical, and very accurate polarization states are usually required after rotation, which results in very stringent fabrication tolerances in order to implement these devices. Furthermore, polarization splitters and rotators in SOI often require high aspect-ratio features, extra layers, and/or an air cladding, which are usually not compatible with CMOS processes.

Hence, what is needed is an optical transceiver without the above-described problems.

SUMMARY

One embodiment of the present disclosure provides an integrated circuit that facilitates wavelength-division multiplexing. This integrated circuit includes a wavelength-filter layer stack that includes: an information optical waveguide that, during operation, communicates an optical signal with an optical fiber via edge coupling; an optical multiplexer/demultiplexer optically coupled to the information optical waveguide; a set of wavelength-filter optical waveguides optically coupled to the optical multiplexer/demultiplexer; and wavelength-filter optical couplers optically coupled to the set of wavelength-filter optical waveguides, where the wavelength-filter layer stack includes silicon oxynitride. Moreover, the integrated circuit includes an optical substrate that includes: a buried-oxide (BOX) layer disposed on the optical substrate; and a semiconductor layer disposed on the BOX layer. Furthermore, the semiconductor layer includes: vertical optical couplers aligned with the wavelength-filter optical couplers that, during operation, communicate components of the optical signal with the wavelength-filter optical couplers; and a set of optical waveguides optically coupled to the vertical optical couplers.

Note that the wavelength-filter optical couplers and the vertical optical couplers may include: inverse tapers, and/or facet mirrors.

Additionally, the information optical waveguide and the set of wavelength-filter optical waveguides may include channel optical waveguides, and the set of optical waveguides may include ridge optical waveguides. In a region of overlap of the wavelength-filter optical couplers and the vertical optical couplers, a width of the set of wavelength-filter optical waveguides may be decreased; a width of a ridge portion of the ridge optical waveguides may be decreased; while a width of a slab portion of the ridge optical waveguides may be increased; and then, in a region of the ridge optical waveguides without the slab portion, a width of the slab portion of the ridge optical waveguides may be decreased.

Moreover, the wavelength-filter layer stack may include a polarization-dependent-frequency-shift compensator. Furthermore, the optical multiplexer/demultiplexer may include: an Echelle grating, and/or an array waveguide grating. Additionally, the optical substrate may include: photodetectors optically coupled to the set of optical waveguides; and/or modulators optically coupled to the set of optical waveguides.

Note that the integrated circuit may operate without temperature control and/or without tuning of carrier wavelengths in components of the optical signal.

In some embodiments, the integrated circuit provides polarization-insensitive operation.

Moreover, the optical substrate, the BOX layer and the semiconductor layer may constitute a silicon-on-insulator technology.

In some embodiments of the integrated circuit, the optical signal is communicated to the optical substrate instead of the wavelength-filter layer stack. In particular, during operation an optical-fiber coupler in the optical substrate communicates the optical signal with the optical fiber. Moreover, a first information optical waveguide in the optical substrate optically couples the optical-fiber coupler and a first information optical coupler. This first information optical coupler is vertically aligned with a second information optical coupler in the wavelength-filter layer stack, where, during operation, the first information optical coupler communicates the optical signal with the second information optical coupler. Furthermore, a second information optical waveguide optically couples the second information optical coupler and the optical multiplexer/demultiplexer.

Additionally, the second information optical waveguide and the set of wavelength-filter optical waveguides may include channel optical waveguides, and the first information optical waveguide and the set of optical waveguides may include ridge optical waveguides.

Another embodiment provides a system that includes: a processor; a memory that stores a program module; and the integrated circuit. During operation, the program module is executed by the processor.

Another embodiment provides a method for wavelength filtering of an optical signal, which may be performed by the integrated circuit.

Another embodiment provides a method for modulating optical signals, which may be performed by the integrated circuit.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of an integrated circuit, a system that includes the integrated circuit, and a method for wavelength filtering of an optical signal are described. The integrated circuit may include a wavelength-filter layer stack (which may include silicon oxynitride) and an optical substrate (such as a silicon-on-insulator platform). During operation, an optical signal received from an optical fiber or an optical waveguide is wavelength filtered into a set of wavelength-filter optical waveguides by an optical multiplexer/demultiplexer (such as an Echelle grating and/or an array waveguide grating) in the wavelength-filter layer stack. Then, wavelength-filtered optical signals are optically coupled to the optical substrate, where they are received using photodetectors. Alternatively, modulators in the optical substrate modulate wavelength-filtered modulated optical signals, which are then optically coupled to the set of wavelength-filter optical waveguides in the wavelength-filter layer stack. Next, the wavelength-filtered modulated optical signals are combined using the optical multiplexer/demultiplexer, and the resulting optical signal is output to the optical fiber or the optical waveguide.

By separating different functions into the wavelength-filter layer stack and the optical substrate, the integrated circuit may provide polarization-insensitive operation. Moreover, the integrated circuit may operate without temperature control and/or without tuning of carrier wavelengths in components of the optical signal. Furthermore, the integrated circuit may: be easier to fabricate and have higher yield, lower cost, and improved performance. Consequently, the integrated circuit may facilitate silicon photonic links for use in applications such as wavelength-division multiplexing.

Figure 1:
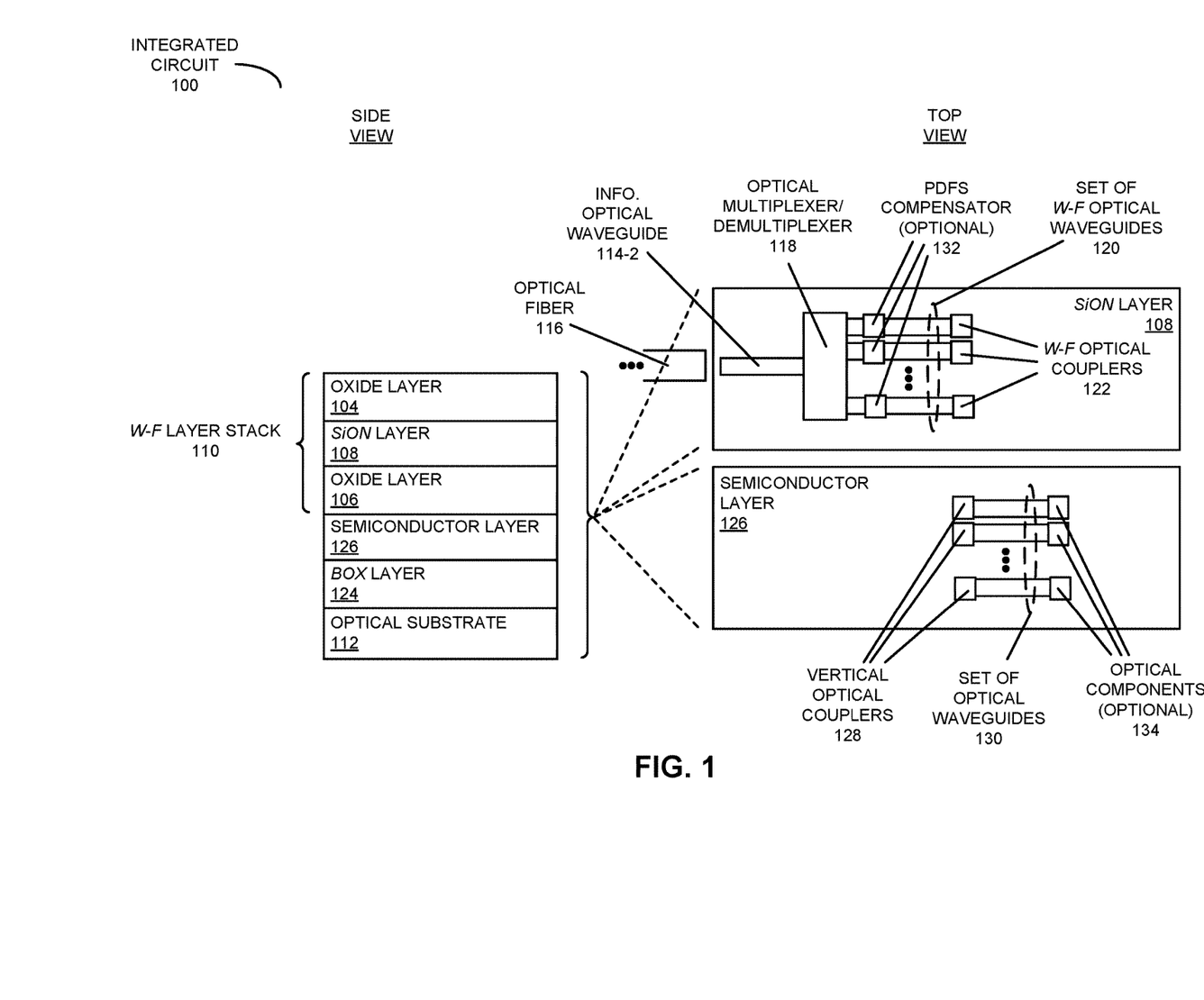
FIG. 1 is a block diagram illustrating an integrated circuit in accordance with an embodiment of the present disclosure.

We now describe embodiments of the integrated circuit. FIG. 1 presents a block diagram illustrating an integrated circuit 100. This integrated circuit includes a wavelength-filter (W-F) substrate 110 that faces and is optically coupled to optical substrate 112. As shown in the top view of wavelength-filter layer stack 110, wavelength-filter layer stack 110 may include: an information optical waveguide 114-2 that, during operation, communicates an optical signal with an optical fiber 116 (or an optical waveguide) via edge coupling; an optical multiplexer/demultiplexer 118 optically coupled to information optical waveguide 114-2; a set of wavelength-filter optical waveguides 120 optically coupled to optical multiplexer/demultiplexer 118; and wavelength-filter optical couplers 122 optically coupled to the set of wavelength-filter optical waveguides 120. Note that, as shown in the side view, wavelength-filter layer stack 110 may include: an oxide layer 106 (such as silicon dioxide) disposed on optical substrate 112; and and a oxide layer 104 (such as silicon dioxide) disposed on silicon-oxynitride (SiON) layer 108.

Moreover, as shown in the side view of optical substrate 112, optical substrate 112 may include: a buried-oxide (BOX) layer 124 disposed on optical substrate 112; and a semiconductor layer 126 disposed on BOX layer 124. In some embodiments, optical substrate 112 includes silicon, BOX layer 124 includes silicon dioxide and semiconductor layer 126 includes silicon, i.e., optical substrate 112, BOX layer 124 and semiconductor layer 126 constitute a silicon-on-insulator (SOI) technology.

Furthermore, as shown in the top view, semiconductor layer 126 may include: vertical optical couplers 128 aligned with wavelength-filter optical couplers 122 that, during operation, communicate components of the optical signal with wavelength-filter optical couplers 122; and a set of optical waveguides 130 optically coupled to the vertical optical couplers 128.

Note that wavelength-filter optical couplers 122 and vertical optical couplers 128 may include: inverse tapers, and/or facet mirrors.

In some embodiments, wavelength-filter layer stack 110 includes an optional polarization-dependent-frequency-shift (PDFS) compensator 132 (e.g., it may be etched into wavelength-filter layer stack 110). Furthermore, optical multiplexer/demultiplexer 118 may include: an Echelle grating, and/or an array waveguide grating. Moreover, optical substrate 112 may include optional optical components 134, such as: photodetectors optically coupled to the set of optical waveguides 130; and/or modulators optically coupled to the set of optical waveguides 130.

During operation of integrated circuit 100, the optical signal may be received from optical fiber 116 and may be conveyed by information optical waveguide 114-2 to optical multiplexer/demultiplexer 118, which may wavelength-filter components of the optical signal into the set of wavelength-filter optical waveguides 120. Then, wavelength-filter optical couplers 122 may optically couple the components of the optical signal via vertical optical couplers 128 into the set of optical waveguides 130. Next, the components of the optical signal may be received by optional optical components 134, such as the photodetectors.

Alternatively, modulated optical signals may be generated using optional optical components 134, such as the modulators. These modulated optical signals may be conveyed to vertical optical couplers 128 by the set of optical waveguides 130. Then, vertical optical couplers 128 may optically couple the modulated optical signals into the set of wavelength-filter optical waveguides 120 via wavelength-filter optical couplers 122. Next, the modulated optical signals may be combined into the optical signal by optical multiplexer/demultiplexer 118, and the optical signal may be conveyed by information optical waveguide 114-2. Moreover, the optical signal may be output using optical fiber 116.

Figure 2:
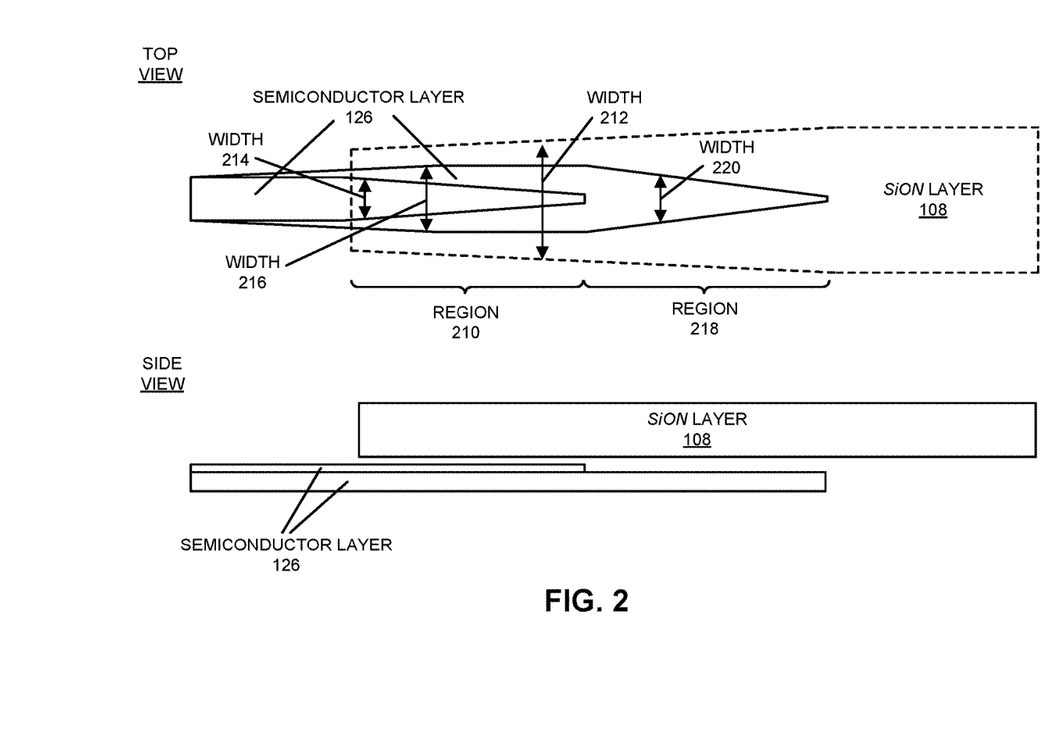
FIG. 2 is a block diagram illustrating optical waveguides in the integrated circuit of FIG. 1 in accordance with an embodiment of the present disclosure.

Furthermore, information optical waveguide 114-2 and the set of wavelength-filter optical waveguides 120 may include channel optical waveguides, and set of optical waveguides 130 may include ridge optical waveguides. As shown in FIG. 2, which presents a block diagram illustrating optical waveguides in integrated circuit 100 (FIG. 1), bi-level inverse tapers may be optionally included in integrated circuit 100 (FIG. 1) to reduce or eliminate a residual polarization dependence. In particular, in a region 210 of overlap of wavelength-filter optical couplers 122 (FIG. 1) and vertical optical couplers 128 (FIG. 1), a width 212 of each of the set of wavelength-filter optical waveguides 120 may be decreased; a width 214 of a ridge portion of the ridge optical waveguides may be decreased, while a width 216 of a slab portion of the ridge optical waveguides may be increased; and then, in a region 218 of the ridge optical waveguides without the slab portion, a width 220 of the slab portion of the ridge optical waveguides may be decreased. In an exemplary embodiment, silicon semiconductor layer 126 (FIG. 1) has an initial width of 300 nm. Then, silicon semiconductor layer 126 is tapered to 200 nm. Furthermore, the slab may then be tapered to 80 nm.

Note that integrated circuit 100 may operate without temperature control and/or without tuning of carrier wavelengths in components of the optical signal. Moreover, integrated circuit 100 may provide polarization-insensitive operation.

Figure 3:
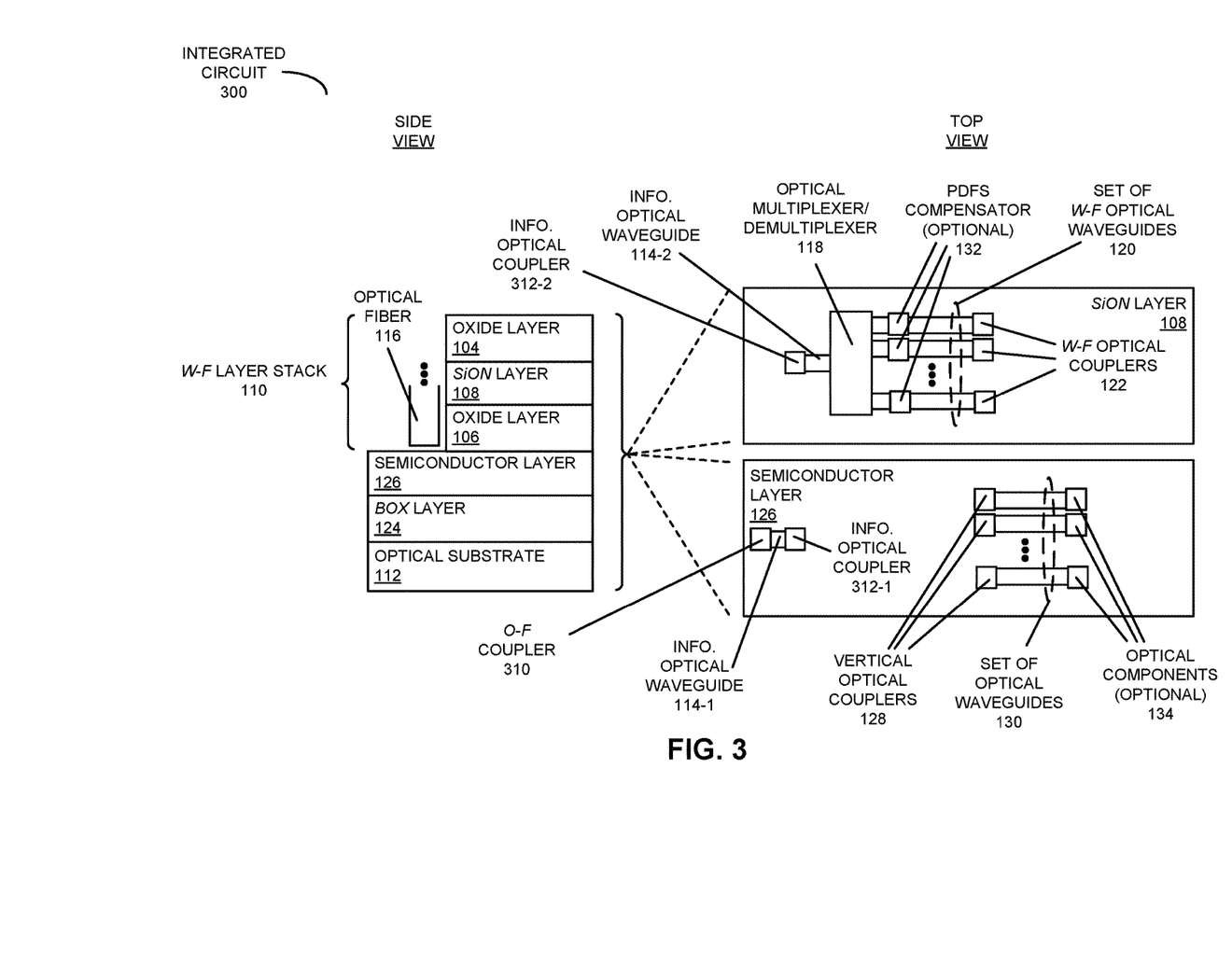
FIG. 3 is a block diagram illustrating an integrated circuit in accordance with an embodiment of the present disclosure.

In some embodiments of the integrated circuit, the optical signal is first communicated to optical substrate 112 instead of wavelength-filter layer stack 110 (i.e., vertical optical coupling is used with optical fiber 116 instead of edge coupling). This is shown in FIG. 3, which presents a block diagram illustrating an integrated circuit 300. In particular, during operation optical-fiber (O-F) coupler 310 in optical substrate 112 communicates the optical signal with optical fiber 116. Moreover, information optical waveguide 114-1 in optical substrate 112 optically couples the optical signal to information optical coupler 312-1. This information optical coupler is vertically aligned with information optical coupler 312-2 in wavelength-filter layer stack 110, where, during operation, information optical coupler 312-1 communicates the optical signal with the second information optical coupler 312-2. Furthermore, information optical waveguide 114-2 optically couples information optical coupler 312-2 and optical multiplexer/demultiplexer 118.

Note that information optical waveguides 114-1 and 114-2 and the set of wavelength-filter optical waveguides 120 may include channel optical waveguides, and the set of optical waveguides 130 may include ridge optical waveguides. Moreover, optical fiber coupler 310 and information optical couplers 312 may include: inverse tapers, and/or facet mirrors.

In an exemplary embodiment, the integrated circuit provides a low-loss tuning-free polarization-state-independent WDM transceiver design for optical communication. More specifically, the integrated circuit includes an optical wavelength filter fabricated on silicon oxynitride, interlayer vertical optical couplers between the silicon oxynitride and silicon, and built-in germanium photodetector arrays in silicon-on-insulator to provide tuning-free polarization-insensitive optical signal detection.

In the discussion that follows, an optical receiver is used as an illustration. However, this architecture may also be used for an optical transmitter. For example, photodetectors may be replaced with broadband modulators that operate on spectrally distinct and separated input carrier wavelengths. The modulated optical signals may be input into an optical multiplexer, and then may be optically coupled to an output optical fiber that conveys the modulated light at the respective carrier wavelengths.

In particular, the integrated circuit may use a thick silicon-oxynitride as the optical waveguide media for the input light from an optical fiber. An optical wavelength filter is built using this thick silicon oxynitride layer to de-multiplex the incoming wavelengths in an optical signal. Moreover, vertical optical couplers between the silicon oxynitride and silicon are implemented to transfer the large silicon-oxynitride optical mode to a smaller silicon optical mode, and then to further guide the output signal to the germanium photodetector arrays (which may be monolithically integrated on an SOI platform).

This WDM receiver may have significantly reduced sensitivity to temperature variation, fabrication errors and material non-uniformities. Furthermore, with WDM built on a silicon-oxynitride layer instead of a silicon layer, this WDM receiver may be independent of the polarization-state of the received optical signal.

Although SOI provides high index-of-refraction contrast and the ability to integrate with modulators and detectors using CMOS-compatible processes, silicon is often not the ideal material for certain optical functions. For example, for passive devices, when the footprint is not the major concern, a low index-of-refraction material, such as silicon oxynitride may be a better candidate. Silicon oxynitride typically has greatly reduced thermo-optic effects and lower optical non-linearities than silicon. Moreover, silicon-oxynitride optical waveguides often have much lower propagation loss from sidewall scattering, and lower sensitivity to variations in optical waveguide dimensions. In addition, polarization-independent optical waveguide design can be realized in thick silicon-oxynitride layers without sacrificing the performance of the optical waveguide. Therefore, the integration of silicon oxynitride onto submicron 501 platforms may be a better solution for combining active and passive functions in CMOS-compatible integrated photonics.

As shown in FIGS. 1 and 3, the tuning-free polarization-insensitive WDM receiver may be built on such a hybrid platform. In this platform, a thick layer of, e.g., 3 µm silicon oxynitride may be deposited or disposed on a thin silicon dioxide layer of, e.g., 80-100 nm, which in turn is deposited or disposed on a silicon layer.

The edge-coupling architecture shown in FIG. 1 may offer reduced integration loss. In particular, direct butt coupling between an optical fiber and submicron silicon optical waveguides can be challenging because of large optical mode mismatch. In contrast, optical coupling via silicon grating couplers may simplify the alignment process (with a typical loss of about 2-3 dB), while edge coupling to a much larger optical mode from the top, low index-of-refraction dielectric layer (such as silicon oxynitride) may further reduce the loss to below 1 dB. However, instead of using a spot-size converter at the interface of the optical fiber and the silicon oxynitride to guide light through the silicon-oxynitride optical waveguide directly into the silicon optical waveguide, in integrated circuit 100 the incident light may first propagate through a wavelength filter on a low index-of-refraction silicon-oxynitride layer, and the de-multiplexed light may then be converted into a silicon optical waveguide mode by the vertical optical couplers. Moreover, germanium photodetector arrays may be implemented at the end of the silicon optical waveguides to collect all the light.

As shown in FIG. 3, this wavelength-filtering technique is not limited to low-loss edge coupling with the silicon oxynitride. In some applications (such as those where edge coupling is not available), a polarization-transparent grating coupler can be implemented on SOI to receive the incident light from the optical fiber. While, in this case, the total integration loss may be higher because of the higher loss associated with this grating coupler, this embodiment may provide a simpler coupling technique without the need for deep-trench etching and the removal of back-end-of-line (BEOL) dielectric stacks.

With wavelength filters built on silicon oxynitride, the WDM receiver may have extremely low temperature and fabrication sensitivity. For a WDM link, the receiver filter spectrum may have to match the transmitter spectrum in order to maximize the received optical signals. In many applications, temperature controllers are often used at the incident lasers to prevent wavelength drift because of bias-current variations and device aging. Moreover, tunable modulators and wavelength multiplexers are usually adjusted using built-in heaters to align them with the laser channels.

Furthermore, at the receiver, the de-multiplexer often operates under un-cooled conditions. Because many wavelength filters are based on the phase relationships between different elements, changes in the effective index of refraction (and, thus, the propagation constant) of the optical waveguides because of temperature drift and fabrication imperfections may change the spectra of the wavelength filters. Therefore, temperature and fabrication dependences of the wavelength-filter material typically play an important role in the overall receiver performance. Note that the thermo-optical (TO) coefficient of silicon is around $1.86 \cdot 10^{-4}$/K, while silicon oxynitride has a much lower TO coefficient (depending on composition, 0.1 to $0.4 \cdot 10^{-4}$/K). This dramatically reduced TO effect (approximately 10× less than silicon) makes silicon oxynitride more suitable for un-cooled applications. Additionally, the center wavelength of the WDM receiver may have much lower sensitivity to processing non-uniformities. Because the center wavelength of wavelength filters built in submicron-SOI is typically determined by the slab thickness, the center wavelength shift can be a few nanometers for a 3% SOI thickness variation. However, a similar change in a 3 µm thick silicon-oxynitride slab may only move the center wavelength by a few tenths of a nanometer. Thus, the WDM receiver can greatly relax the strict fabrication tolerances, and may potentially increase device yield. With a 50-60% flat-top 1 dB bandwidth enabled by optical mode expanders or tapers, the WDM receiver may provide temperature-insensitive operation without any active tuning.

In addition to tuning-free operation, the wavelength-filtering technique may provide polarization-transparent operation without using two sets of identical wavelength filters and routing optical waveguides. In a thin silicon platform, it is usually almost impossible to design an optical waveguide that can support both polarizations equally with relatively low optical waveguide loss. However, optical waveguides based on silicon oxynitride typically have much less birefringence, especially when the guiding layer is thick enough. For example, a square-channel optical waveguide (such as 3×3 µm$^2$) can support both TE and TM modes with the same effective index of refraction, and both optical modes may be very well confined inside the optical waveguides. Therefore, it is possible for WDM designs (such as an arrayed-waveguide grating or an Echelle grating) to achieve extremely low polarization-dependent loss (PDL) and polarization-dependent frequency shift (PDFS) using this approach.

A typical arrayed-waveguide grating may include: an input optical waveguide, output optical waveguides, arrayed arms, and two free propagation slabs. Similarly, an Echelle grating may include: input/output optical waveguides, and a large free-propagation region (FPR). For all the optical waveguide-related elements, the square channel optical waveguide approach can be applied to reduce or eliminate the birefringence. Note that for the slab regions, there are two different cases depending on the channel spacing of the WDM design. Theoretically, the propagation velocities of the two polarizations are very close in a silicon-oxynitride slab of 3 µm or thicker. In most cases, where wavelength spacing is around a few nanometers (and, thus, relatively small slab regions are typically needed), the polarization dependence in the FPR is usually negligible. However, in cases when a very narrow channel spacing (such as less than 0.8 nm), and thus a large linear dispersion strength is needed, an FPR with a larger Rowland circle radius may need to be implemented. When the slab region increases, the PDFS may also increase, which may result in large crosstalk because of narrow channel spacing. In this situation, polarization insensitivity can be achieved by the compensation techniques, such as a PDFS compensator formed by cladding partial etch, or by stress-release grooves that control or eliminate the modal birefringence in silicon-oxynitride slabs. For example, the PDFS compensator and/or the stress-release grooves may be included in the FPR.

Moreover, the vertical optical coupler may need to be transparent to any polarization to make the WDM receiver polarization-insensitive. Generally, an interlayer vertical optical waveguide optical coupler may be realized with linear inverse tapers, which have a shallow linear slope to ensure an adiabatic evolution of the optical mode. However, in the silicon oxynitride-SOI hybrid platform, it may be difficult to meet the effective index-of-refraction matching condition because of the large index-of-refraction difference between a silicon optical waveguide and a silicon-oxynitride optical waveguide.

As shown in FIG. 2, this problem may be solved using an adiabatic bi-level silicon optical waveguide taper that is designed to further decrease the silicon optical waveguide index of refraction. Note that the top silicon-oxynitride taper may be centrally symmetric to the bottom silicon taper. The silicon taper may begin with a fully etched wire optical waveguide, and then may gradually convert to a rib optical waveguide. Moreover, the top optical waveguide may start to narrow down and may be terminated with a blunt tip while the slab optical waveguide width may be kept constant. After that, the silicon slab may be tapered down to further push the optical mode into the top silicon-oxynitride optical waveguide. Using this bi-level taper design for the vertical optical coupling between the silicon oxynitride and SOI may greatly relax the processing resolution of the taper tips. It may also provide greater tolerance for the variation of silicon-oxynitride material properties and may help ensure optical impedance matching for the optical power to be efficiently transferred regardless of the index of fraction of the silicon oxynitride.

Alternatively, if only the wire SOI optical waveguide is tapered, it may be difficult to achieve an index-of-refraction match condition. While the optical coupler transition loss is, in general, related to the taper tip size, the loss difference associated with different polarizations usually results from polarization-dependent coupling between the bottom silicon and the top silicon-oxynitride optical waveguide. The optical coupling coefficient of a TM mode is usually lower than a TE mode, because most tapers favor the optical mode transition for the TE polarization. However, using the bi-level taper design shown in FIG. 2, polarization-independent optical couplers can be implemented by optimizing the index of refraction of the silicon oxynitride, the silicon-dioxide gap between the optical waveguides, and the thickness of the slab optical waveguide.

In summary, the integrated circuit may provide a low loss, tuning-free, polarization-insensitive WDM optical receiver or transmitter. Moreover, the integrated circuit may: handle both orthogonal polarization states of incident light, reduce or eliminate the wavelength drift associated with the operating temperature of the integrated circuit, reduce the sensitivity to fabrication variations, and reduce insertion or coupling loss, as well as optical waveguide propagation loss. Therefore, the integrated circuit may allow WDM silicon photonics to be used in low-cost, high-density optical interconnect applications.

Figure 4:
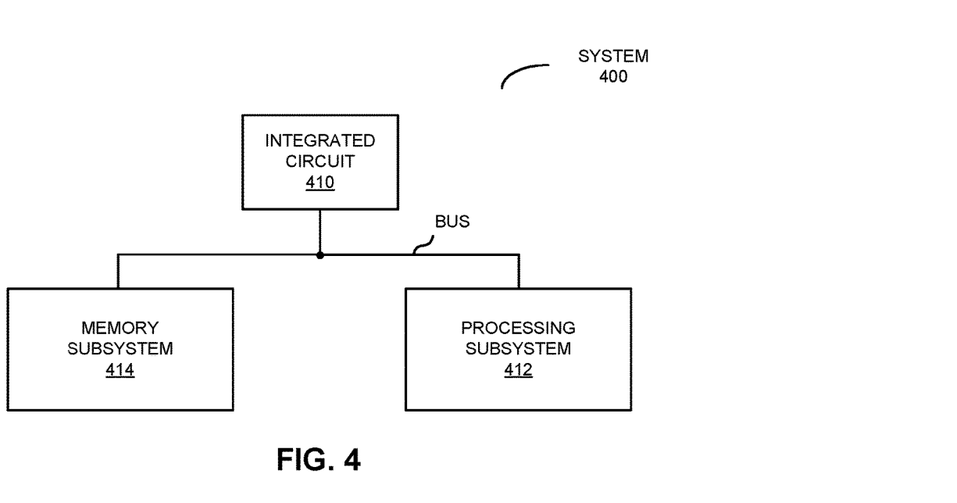
FIG. 4 is a block diagram illustrating a system that includes the integrated circuit of FIG. 1 or 3 in accordance with an embodiment of the present disclosure.

FIG. 4 presents a block diagram illustrating a system 400 (or an electronic device) that includes an integrated circuit 410, which may be integrated circuit 100 (FIG. 1) or 300 (FIG. 3). In some embodiments, system 400 includes processing subsystem 412 (with one or more processors) and memory subsystem 414 (with memory).

In general, functions of integrated circuit 410 and system 400 may be implemented in hardware and/or in software. Thus, system 400 may include one or more program modules or sets of instructions stored in a memory subsystem 414 (such as DRAM or another type of volatile or non-volatile computer-readable memory), which, during operation, may be executed by a processing subsystem 412. Note that the one or more computer programs may constitute a computer-program mechanism. Furthermore, instructions in the various modules in memory subsystem 414 may be implemented in: a high-level procedural language, an object-oriented programming language, and/or in an assembly or machine language. Note that the programming language may be compiled or interpreted, e.g., configurable or configured, to be executed by the processing subsystem.

Components in system 400 may be coupled by signal lines, links or buses. These connections may include electrical, optical, or electro-optical communication of signals and/or data. Furthermore, in the preceding embodiments, some components are shown directly connected to one another, while others are shown connected via intermediate components. In each instance, the method of interconnection, or 'coupling,' establishes some desired communication between two or more circuit nodes, or terminals. Such coupling may often be accomplished using a number of circuit configurations, as will be understood by those of skill in the art; for example, AC coupling and/or DC coupling may be used.

In some embodiments, functionality in these circuits, components and devices may be implemented in one or more: application-specific integrated circuits (ASICs), field-programmable gate arrays (FPGAs), and/or one or more digital signal processors (DSPs). Furthermore, functionality in the preceding embodiments may be implemented more in hardware and less in software, or less in hardware and more in software, as is known in the art. In general, system 400 may be at one location or may be distributed over multiple, geographically dispersed locations.

System 400 may include: a VLSI circuit, a switch, a hub, a bridge, a router, a communication system (such as a wavelength-division-multiplexing communication system), a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a tablet computer, a supercomputer, a network-attached-storage (NAS) system, a storage-area-network (SAN) system, a media player (such as an MP3 player), an appliance, a subnotebook/netbook, a tablet computer, a smartphone, a cellular telephone, a network appliance, a set-top box, a personal digital assistant (PDA), a toy, a controller, a digital signal processor, a game console, a device controller, a computational engine within an appliance, a consumer-electronic device, a portable computing device or a portable electronic device, a personal organizer, and/or another electronic device. Note that a given computer system may be at one location or may be distributed over multiple, geographically dispersed locations.

Moreover, integrated circuit 410 can be used in a wide variety of applications, such as: optical communications (for example, in a transceiver, an optical interconnect or an optical link, such as for intra-chip or inter-chip communication), a radio-frequency filter, a bio-sensor, data storage (such as an optical-storage device or system), medicine (such as a diagnostic technique or surgery), a barcode scanner, and/or metrology (such as precision measurements of distance).

Furthermore, the embodiments of integrated circuit 410 and/or system 400 may include fewer components or additional components. Although these embodiments are illustrated as having a number of discrete items, these optical components, integrated circuits and the system are intended to be functional descriptions of the various features that may be present rather than structural schematics of the embodiments described herein. Consequently, in these embodiments two or more components may be combined into a single component, and/or a position of one or more components may be changed. In addition, functionality in the preceding embodiments of the optical source, integrated circuit 410 and/or system 400 may be implemented more in hardware and less in software, or less in hardware and more in software, as is known in the art.

While the preceding embodiments have been illustrated with particular elements and compounds, a wide variety of materials and compositions (including stoichiometric and non-stoichiometric compositions, e.g., of silicon oxynitride) may be used, as is known to one of skill in the art. Thus, while a silicon optical waveguide was illustrated in the preceding embodiments, the wavelength-filtering technique may be used with other materials (such as germanium and/or silicon germanium), as is known to one of skill in the art. Moreover, the semiconductor layer may include polysilicon or amorphous silicon. Furthermore, the materials and compounds in integrated circuit 410 may be fabricated using a wide variety of processing techniques, including: evaporation, sputtering, chemical vapor deposition, molecular-beam epitaxy, wet or dry etching (such as photolithography or direct-write lithography), polishing, etc. In addition, a wide variety of optical components may be used in or in conjunction with the optical source and/or integrated circuit 410. Furthermore, a wide variety of optical sources may be integrated or included in integrated circuit 410, including many different types of lasers or non-laser optical sources (such as a light emitting diode).

Figure 5:
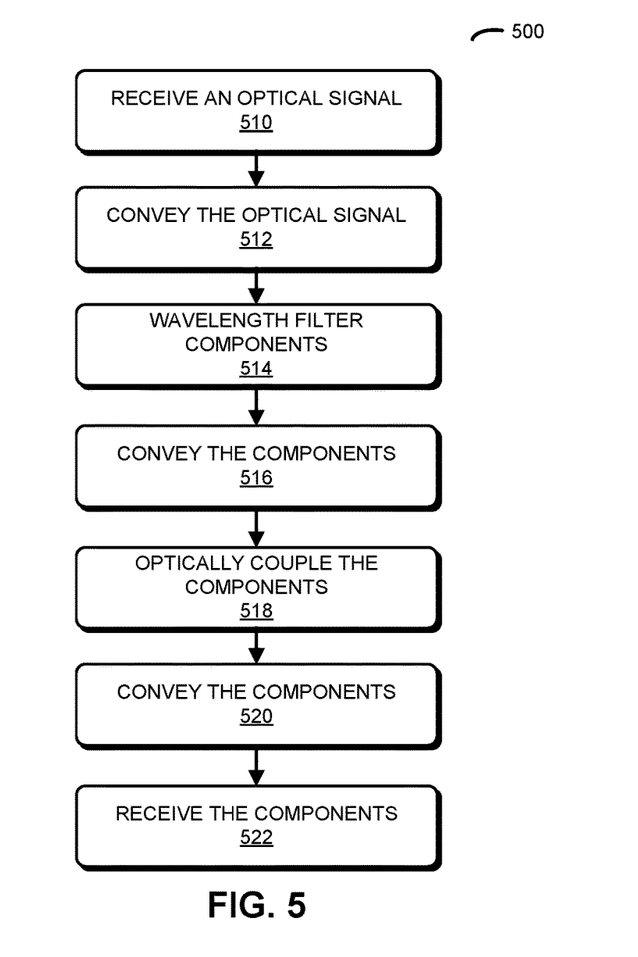
FIG. 5 is a flow chart illustrating a method for wavelength filtering of an optical signal in accordance with an embodiment of the present disclosure.

We now describe embodiments of the method. FIG. 5 presents a flow chart illustrating a method 500 for wavelength filtering of an optical signal, which may be performed by an embodiment of an integrated circuit, such as integrated circuit 100 (FIG. 1) or 300 (FIG. 3). During operation, a wavelength-filter layer stack may receive an optical signal (operation 510). Then, an information optical waveguide may convey the optical signal (operation 512). Moreover, an optical demultiplexer may wavelength filter components (operation 514) in the optical signal. Next, a set of wavelength-filter optical waveguides may convey the components (operation 516) of the optical signal to wavelength-filter optical couplers, which, in conjunction with vertical optical couplers, may optically couple the components (operation 518) of the optical signal into a set of optical waveguides. Furthermore, the set of optical waveguides may convey the components (operation 520) of the optical signal into photodetectors, which may receive the components (operation 522).

Figure 6:
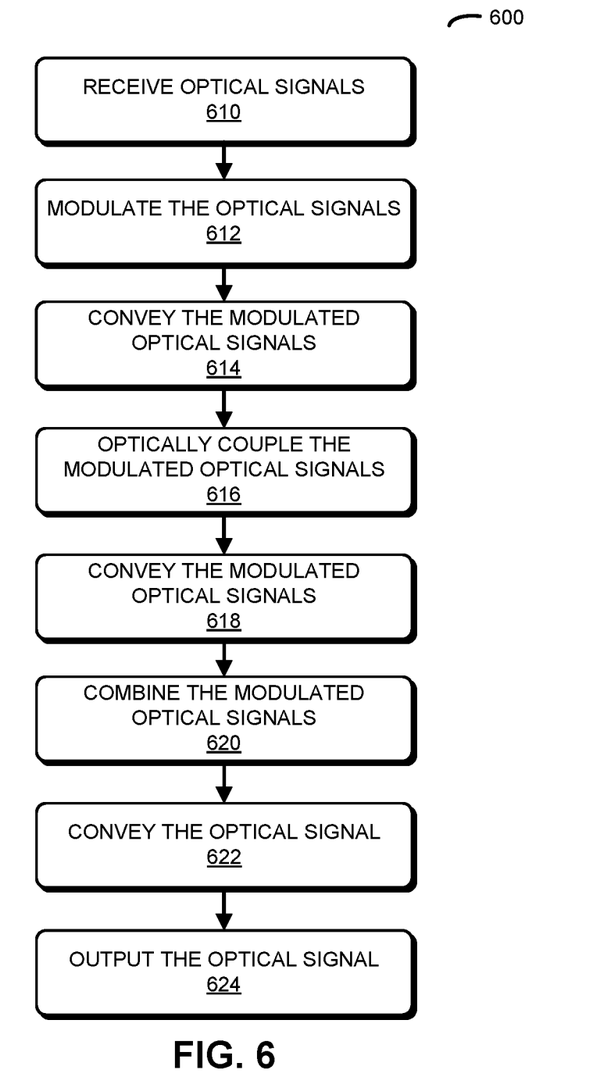
FIG. 6 is a flow chart illustrating a method for modulating optical signals in accordance with an embodiment of the present disclosure.

FIG. 6 presents a flow chart illustrating a method 600 for modulating optical signals, which may be performed by an embodiment of an integrated circuit, such as integrated circuit 100 (FIG. 1) or 300 (FIG. 3). During operation, an optical substrate may receive optical signals (operation 610), which may be modulated (operation 612) by modulators. Then, a set of optical waveguides may convey the modulated optical signals (operation 614) to vertical optical couplers, which, in conjunction with wavelength-filter optical couplers, may optically couple the modulated optical signals (operation 616) into a set of wavelength-filter optical waveguides. Moreover, the set of wavelength-filter optical waveguides may convey the modulated optical signals (operation 618) into an optical multiplexer, which may combine the modulated optical signals (operation 620) into an optical signal. Next, an information optical waveguide may convey the optical signal (operation 622) and the optical signal may be output (operation 624) to an optical fiber.

In some embodiments of methods 500 (FIG. 5) and/or 600, there may be additional or fewer operations. Moreover, the order of the operations may be changed, and/or two or more operations may be combined into a single operation.

The integrated circuit may be used in a wide variety of applications, such as: communications, manufacturing (cutting or welding), a lithographic process, data storage (such as an optical-storage device or system), medicine (such as a diagnostic technique or surgery), a barcode scanner, entertainment (a laser light show), and/or metrology (such as precision measurements of distance).

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An integrated circuit, comprising:
    a wavelength-filter layer stack that includes:
        a first information optical coupler that, during operation, communicates an optical signal;
        a first information optical waveguide optically coupled to the first information optical coupler;
        an optical multiplexer/demultiplexer optically coupled to the first information optical waveguide;
        a set of wavelength-filter optical waveguides optically coupled to the optical multiplexer/demultiplexer; and
        wavelength-filter optical couplers optically coupled to the set of wavelength-filter optical waveguides, wherein the wavelength-filter layer stack includes silicon oxynitride; and
    an optical substrate that includes:
        a buried-oxide (BOX) layer disposed on the optical substrate; and
        a semiconductor layer disposed on the BOX layer, wherein the semiconductor layer includes:
            an optical-fiber coupler that, during operation, communicates the optical signal with an optical fiber;
            a second information optical waveguide optically coupled to the optical-fiber coupler;
            a second information optical coupler optically coupled to the second information optical waveguide and vertically aligned with the wavelength-filter optical coupler, wherein, during operation, the second information optical coupler communicates the optical signal with the first information optical coupler;
            vertical couplers aligned with the wavelength-filter optical couplers that, during operation, communicate components of the optical signal with the wavelength-filter optical couplers; and
            a set of optical waveguides optically coupled to the vertical optical couplers;
    wherein the first and second information optical waveguides and the set of wavelength-filter optical waveguides include channel optical waveguides;
    wherein the set of optical waveguides includes ridge optical waveguides; and
    wherein, in a region of overlap of the wavelength-filter optical couplers and the vertical optical couplers, a width of the set of wavelength-filter optical waveguides is decreased, a width of a ridge portion of the ridge optical waveguides is decreased while a width of a slab portion of the ridge optical waveguides is increased, and then, in a region of the ridge optical waveguides without the slab portion, a width of the slab portion of the ridge optical waveguides is decreased.

2. The integrated circuit of claim 1, wherein the first information optical coupler, the second information optical coupler, the wavelength-filter optical couplers and the vertical optical couplers include one of: inverse tapers, and facet mirrors.

3. The integrated circuit of claim 1, wherein the wavelength-filter layer stack includes a polarization-dependent-frequency-shift compensator.

4. The integrated circuit of claim 1, wherein the optical multiplexer/demultiplexer includes one of: an Echelle grating, and an array waveguide grating.

5. The integrated circuit of claim 1, wherein the optical substrate includes one of: photodetectors optically coupled to the set of wavelength-filter optical waveguides; and modulators optically coupled to the set of wavelength-filter optical waveguides.

6. The integrated circuit of claim 1, wherein the integrated circuit operates without tuning of carrier wavelengths in components of the optical signal.

7. A system, comprising:
    a processor;
    a memory, coupled to the processor, that stores a program module, which, during operation, is executed by the processor; and
    an integrated circuit, wherein the integrated circuit includes:
        a wavelength-filter layer stack that includes:
            a first information optical coupler that, during operation, communicates an optical signal;
            a first information optical waveguide optically coupled to the first information optical coupler;
            an optical multiplexer/demultiplexer optically coupled to the first information optical waveguide;
            a set of wavelength-filter optical waveguides optically coupled to the optical multiplexer/demultiplexer; and
            wavelength-filter optical couplers optically coupled to the set of wavelength-filter optical waveguides, wherein the wavelength-filter layer stack includes silicon oxynitride; and
        an optical substrate that includes:
            a buried-oxide (BOX) layer disposed on the optical substrate; and
            a semiconductor layer disposed on the BOX layer, wherein the semiconductor layer includes:
                an optical-fiber coupler that, during operation, communicates the optical signal with an optical fiber;
                a second information optical waveguide optically coupled to the optical-fiber coupler;
                a second information optical coupler optically coupled to the second information optical waveguide and vertically aligned with the wavelength-filter optical coupler, wherein, during operation, the second information optical coupler communicates the optical signal with the first information optical coupler;

vertical couplers aligned with the wavelength-filter optical couplers that, during operation, communicate components of the optical signal with the wavelength-filter optical couplers; and a set of optical waveguides optically coupled to the vertical optical couplers;

wherein the first and second information optical waveguides and the set of wavelength-filter optical waveguides include channel optical waveguides;

wherein the set of optical waveguides includes ridge optical waveguides; and wherein, in a region of overlap of the wavelength-filter optical couplers and the vertical optical couplers, a width of the set of wavelength-filter optical waveguides is decreased, a width of a ridge portion of the ridge optical waveguides is decreased while a width of a slab portion of the ridge optical waveguides is increased, and then, in a region of the ridge optical waveguides without the slab portion, a width of the slab portion of the ridge optical waveguides is decreased.

* * * * *